(12) United States Patent
Moshrefzadeh

(10) Patent No.: US 6,519,087 B2
(45) Date of Patent: *Feb. 11, 2003

(54) REAR PROJECTION SCREEN INCORPORATING DIFFUSER

(75) Inventor: Robert S. Moshrefzadeh, St. Paul, MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/838,579

(22) Filed: Apr. 10, 1997

(65) Prior Publication Data

US 2002/0109916 A1 Aug. 15, 2002

(51) Int. Cl.[7] .................................................. G03B 2/60
(52) U.S. Cl. ....................................................... 359/453
(58) Field of Search ................................ 359/452, 453, 359/460, 443, 455, 456, 536, 540

(56) References Cited

U.S. PATENT DOCUMENTS

| | | | | |
|---|---|---|---|---|
| 2,378,252 A | | 6/1945 | Staehle et al. ............. 88/28.93 |
| 3,173,332 A | | 3/1965 | Thompson et al. ......... 88/28.93 |
| 3,351,409 A | * | 11/1967 | McGuire ..................... 350/117 |
| 3,372,971 A | * | 3/1968 | Quakenbush et al. ....... 350/117 |
| 3,552,822 A | | 1/1971 | Altman ........................ 359/126 |
| 3,914,024 A | | 10/1975 | Tanabe et al. .............. 350/196 |
| 4,023,889 A | | 5/1977 | Eagon et al. ................ 350/105 |
| 4,190,321 A | | 2/1980 | Dorer et al. ................ 350/165 |
| 4,490,010 A | | 12/1984 | Honda et al. ............... 350/128 |
| 4,519,686 A | | 5/1985 | Seki et al. .................. 354/200 |
| 4,525,029 A | | 6/1985 | Inoue et al. ................ 350/128 |
| 5,170,287 A | | 12/1992 | Ludwig, Jr. et al. ........ 359/452 |
| 5,241,416 A | * | 8/1993 | Mitsutake et al. .......... 359/456 |
| 5,307,205 A | * | 4/1994 | Ludwig, Jr. et al. ........ 359/453 |
| 5,456,967 A | * | 10/1995 | Nezu .......................... 428/141 |
| 5,563,738 A | * | 10/1996 | Vance ......................... 359/614 |
| 5,661,600 A | * | 8/1997 | Mitani et al. ............... 359/457 |
| 5,675,435 A | * | 10/1997 | Ishii et al. .................. 359/460 |
| 5,724,182 A | * | 3/1998 | Mitani et al. ............... 359/457 |

FOREIGN PATENT DOCUMENTS

| | | | |
|---|---|---|---|
| JP | 02077736 | 3/1990 | ........... G03B/21/62 |
| JP | 06160982 | 6/1994 | ........... G03B/21/62 |
| JP | 08043946 | 2/1996 | ........... G03B/21/62 |

* cited by examiner

*Primary Examiner*—Christopher Mahoney
(74) *Attorney, Agent, or Firm*—Stephen W. Buckingham

(57) ABSTRACT

A rear projection screen including a plurality of refracting beads bound in optical contact with a substrate is disclosed. The beads are surrounded by an opaque matrix. A diffuser is positioned such that light traveling through the screen will pass through the diffuser after passing through the beads but before exiting the screen.

3 Claims, 7 Drawing Sheets

REAR PROJECTION SCREEN INCORPORATING DIFFUSER

TECHNICAL FIELD

This technology involves rear projection screens, and in particular rear projection screens having an array of transparent refractive elements in an opaque matrix.

BACKGROUND

A rear projection screen is a sheetlike optical device having a relatively thin viewing layer which is placed at an image surface of an optical projection apparatus. Such a screen makes visible a real image focused by projection apparatus onto the image surface. The viewing layer is typically planar corresponding to the image surfaces produced by most projection apparatus. Other shapes are possible if the image surface of the projection apparatus is not planar. The screen is intended to act as a filter to attenuate, block, or diffuse light which is not part of the projected image, and to transmit from its rear side to its front side that light which is part of the projected image. In this way it enables the viewer to see the projected image when looking at the front side of the screen.

A well-known type of rear projection screen is a thin, light diffusing layer such as a frosted or translucent glass surface, which may be produced by etching, sandblasting, or otherwise roughening a smooth glass surface. The translucent surface limits the visibility of objects behind the screen. The screen must, however, be sufficiently light transmissive to allow the projected image, which is focused precisely on the translucent surface, to be viewed from the front side of the screen. Since the translucent surface scatters light, the image is viewable from a range of viewing angles. Screens that are merely translucent suffer, however, from a tendency to strongly reflect ambient light incident on the front side, thereby causing fading, or washout, of the projected image. This problem is particularly severe if the background or ambient light is bright.

An approach to reducing the effects of ambient light while still maintaining an acceptable level of projected image light is disclosed in U.S. Pat. No. 5,563,738, wherein an array of closely packed glass beads is attached to a transparent substrate by an opaque polymeric binder. The glass beads act as lenses to collect projected light from the rear of the screen and focus it to relatively small spots, near the surfaces of the beads. The foci are in the areas where the beads contact the front support layer.

Because the transparent beads contact the transparent front support layer, they exclude most of the opaque binder material from the space between the beads and their contact areas on the substrate. This forms an optical aperture between each bead and the substrate. The area surrounding each optical aperture is opaque, and preferably black, due to the opaque binder material in the bead interstices. As a result, ambient light incident in these areas is absorbed. Thus the front side of the screen appears black, except for the light transmitted through the beads. Further improvements to the screen are disclosed wherein an additional opaque layer may be applied to the interstices between the beads on the rear side of the screen, and an additional transparent layer may be applied to the beads on the rear side of the screen, thereby altering their optical performance.

Glass bead rear projection screens suffer, however, from certain limitations, especially when they are used to project high quality images that are to be viewed from short distances. More particularly, the appearance of such screens is highly sensitive to the quality and placement of the glass beads used. Beads that are of incorrect size, are not spherical, or are broken, nicked, scratched, or otherwise defective can create a variety of visible defects, variously called graininess, scintillation, sparkles, speckle, punch through, or simply spots. These defects are particularly troubling when the screen is used, for example, as a computer monitor, where the need for seeing a high level of detail is likely to lead the user to scrutinize the screen closely, from a short distance, for long periods of time.

SUMMARY OF THE INVENTION

According to the present invention, a rear projection screen includes a plurality of refracting beads bound in optical contact with a substrate. The beads are surrounded by an opaque matrix. A diffuser is positioned such that light traveling through the screen will pass through the diffuser after passing through the beads but before exiting the screen.

DETAILED DESCRIPTION OF THE PREFERRED EMBODIMENTS

Figure 1:
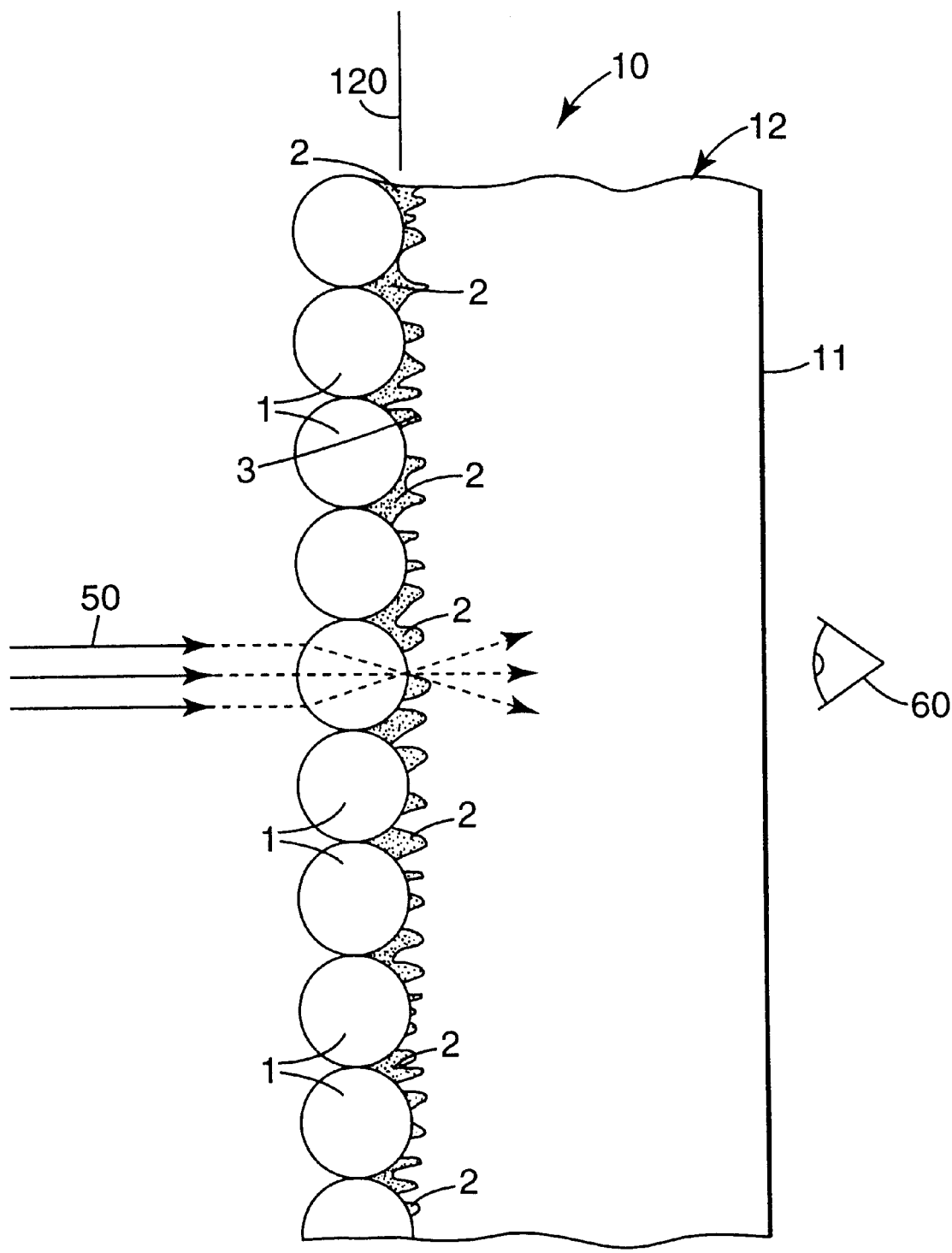
FIG. 1 shows a first embodiment of the present invention.

FIG. 1 portrays a cross sectional view of a first embodiment of a rear projection screen according to the present invention, designated generally as 10. Transparent, refracting, glass beads 1 are attached to and in intimate contact with major surface 3 of transparent substrate 12. Beads 1 are held in place by an opaque adhesive binder material that at least partially fills interstices 2 and also is in intimate adhesive contact with surface 3. It is important that beads 1 be bound in optical contact with substrate 12. By this it is meant that the beads are held in place and that a substantial portion of the light passing through beads 1 will reach substrate 12 even if beads 1 are not in physical contact with substrate 12. According to the present invention, surface 3 exhibits a light randomizing property that may be created by roughening or by providing other optical inhomogeneities. Thus the inhomogeneities on surface 3 act as an optical diffuser. It is preferred that the inhomogeneities be random in nature and have a size in the range of from on the order of the wavelength of visible light to about ten times that wavelength. It is further preferred that the randomizing layer be relatively thin. It is also preferred that, apart from surface 3, substrate 12 be transparent, optically clear, and capable of transmitting optical images without significant scattering or other degradation.

In use, rear projection screen 10 is placed in a location substantially coincident with projected image surface 120 of a projection apparatus, oriented such that the image formed by projected light 50 is incident on beads 1. Viewer 60 then sees, from the front side of the screen, the projected image made visible by rear projection screen 10 after the light emerges through major surface 11 of substrate 12.

The light diffusing layer formed by the inhomogeneities provided on surface 3 reduces the graininess, whether due to incorrect bead size, incorrect bead shape, broken, scratched, or nicked beads, or other bead defects, of the projected image. The surprising result is that the graininess, push through, and other defects are reduced to a level that is unexpectedly low, while the image detail and other viewability features are substantially retained. Furthermore it is surprising that the susceptibility of the screen image to washout by ambient light is not significantly increased by the presence of the optical diffuser on surface 3.

If the inhomogeneities provided on surface 3 are structures, an additional benefit is that the opaque binder material conforms to diffusing surface 3 in interstices 2 between beads 1. This forms a textured, or matte, surface. In some cases this enhances screen appearance by improving the absorption of ambient light on the front of the screen.

Commercially available glass beads in the range of about 60 µm in diameter and having a refractive index of about 1.9 have been found to be effective for the present invention. The preferred beads have an average diameter of 60 µm, a minimum diameter of 25 µm, a maximum diameter of 85 µm, and a standard deviation of 15 µm in diameter. Smaller beads can also be used and may improve the image quality over that obtainable with larger beads. Beads having refractive indices in the range of 1.4 to over 2.0 may be used, depending upon the angular light distribution and gain desired. For these purposes, gain is defined as the ratio of the luminance of the screen on axis to the luminance on axis of a Lambertian source having the same integrated light output. Beads having indices of refraction as high as 2.26 have been successfully used in screens according to the invention. Transparent bead materials other than glass, such as polymeric materials, may also be used.

The opaque binder layer may be made from any suitable material which can be applied to surface 3 of substrate 12. It must produce suitable adhesive bonding to surface 3 and to beads 1, and must be made sufficiently opaque. Preferred materials for the opaque layer are polymeric materials that will accept colorants, preferably black colorants. Preferably, they are able to be coated on surface 3 and held in a softened state until beads 1 can be placed on the coating and pressed into contact with surface 3. Then the binder can be solidified. A preferred binder material is an acrylate loaded with carbon black to make it opaque. Alternatively, an opaque layer could be applied to surface 3 and a separate adhesive layer coated on top of the opaque layer.

Substrate 12 can be of any material that is transparent to visible light and can be processed to form an optical diffuser on surface 3. Polymeric materials such as polymethylmethacrylate and polyethylene terephthalate (PET), and polycarbonate have been found suitable. While polymeric materials have the advantage of light weight and flexibility, glass may also be used.

The optical diffuser on surface 3 may be formed by a variety of means. Sanding of PET film with 100 grit sandpaper has been found to be suitable. Other means, such as embossing, chemical etching, and casting the film onto a suitably roughened casting surface may also be used. In general, any means of fabrication suitable for forming microreplicated or other structured surfaces would be suitable for producing an optical diffuser on surface 3.

Figure 2A:
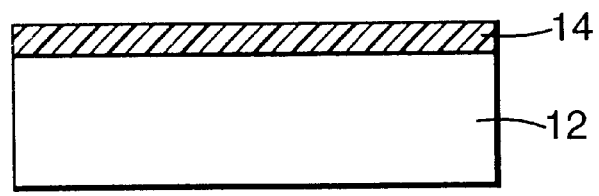
FIG. 2 illustrates a method of making a beaded rear projection screen.

Fabrication of the screen can be performed by first forming an optical diffuser on surface 3 of substrate 12. As shown in FIG. 2a, this is followed by applying opaque layer 14 onto substrate 12. Opaque layer 14 may be applied as a liquid coating, such as a polymeric material dissolved in a suitable solvent system. Alternatively, opaque layer 14 may be extruded onto substrate 12 as a melted thermoplastic resin. The thickness of opaque layer 14 is determined by the volume of the interstices between beads These interstices should be filled.

Figure 2B:
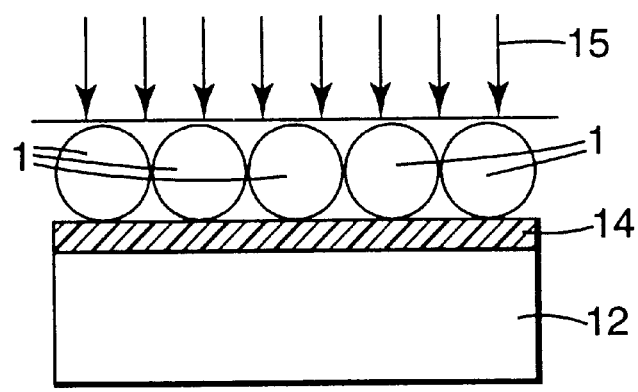
Figure 2C:
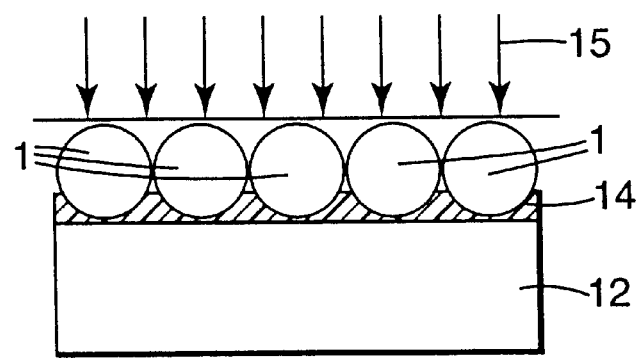

If opaque layer 14 is applied by a solvent based coating process, it is convenient to partially dry the coating, apply beads 1, and press them into contact with surface 3, as shown in FIG. 2b. After beads 1 have been pressed into place, the drying of layer 14 may be completed as shown in FIG. 2c. Punch through defects often result from this process where the solvent based layer is too thin to fully block extraneous light in some places.

If opaque layer 14 is applied by extrusion of a heated thermoplastic resin, beads 1 can applied to opaque layer 14 and opaque layer 14 heated to its softening temperature, prior to pressing beads 1 into place. Beads 1 may be pressed into place by passing through a presser, such as a pair of rolls, that presses the beads into opaque layer 14. It is important that opaque layer 14 be made sufficiently soft to allow beads 1 to be pressed into opaque layer 14 and into contact with surface 3. The process must form optically transparent apertures, without requiring an amount of force that would cause damage to beads 1 or surface 3 of substrate 12. For example, if substrate 12 is glass, care would have to be taken not to break it. If substrate 12 is a polymeric film and beads 1 are glass, care should be taken not to press beads 1 into substrate 12 with such force as to cause bead impressions in substrate 12.

Figure 3:
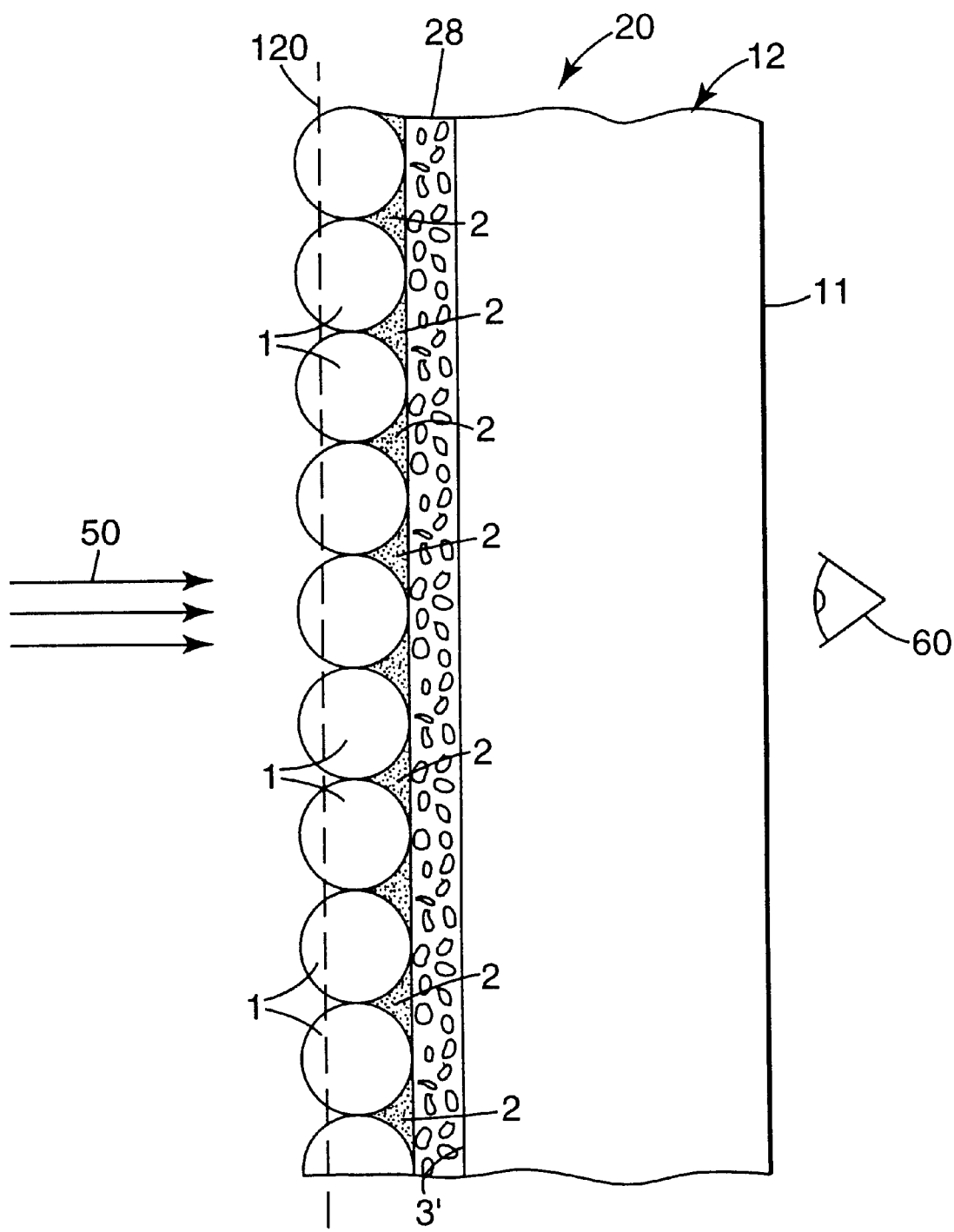
FIG. 3 shows a second embodiment of the present invention.

In a second embodiment, shown in FIG. 3, a rear projection screen is designated generally as 20. In this embodiment, a diffusion layer 28 is formed by coating an optically inhomogeneous material onto surface 3' of substrate 12. Diffusion layer 28 is applied as a separate layer onto substrate 12 prior to application of the opaque binder and beads 1. Diffusion layer 28 may include a transparent polymeric binder, applied by coating or extrusion, within which is dispersed particulate material having a refractive index different from that of the binder. The amount of light diffusion provided by this layer may be controlled by the amount and type of dispersing particulate added to layer 28. It is preferred that thickness of diffusing layer 28 be relatively low, but higher thicknesses may be used, provided that image resolution and other desirable image properties are not degraded to an unacceptable level.

Figure 4:
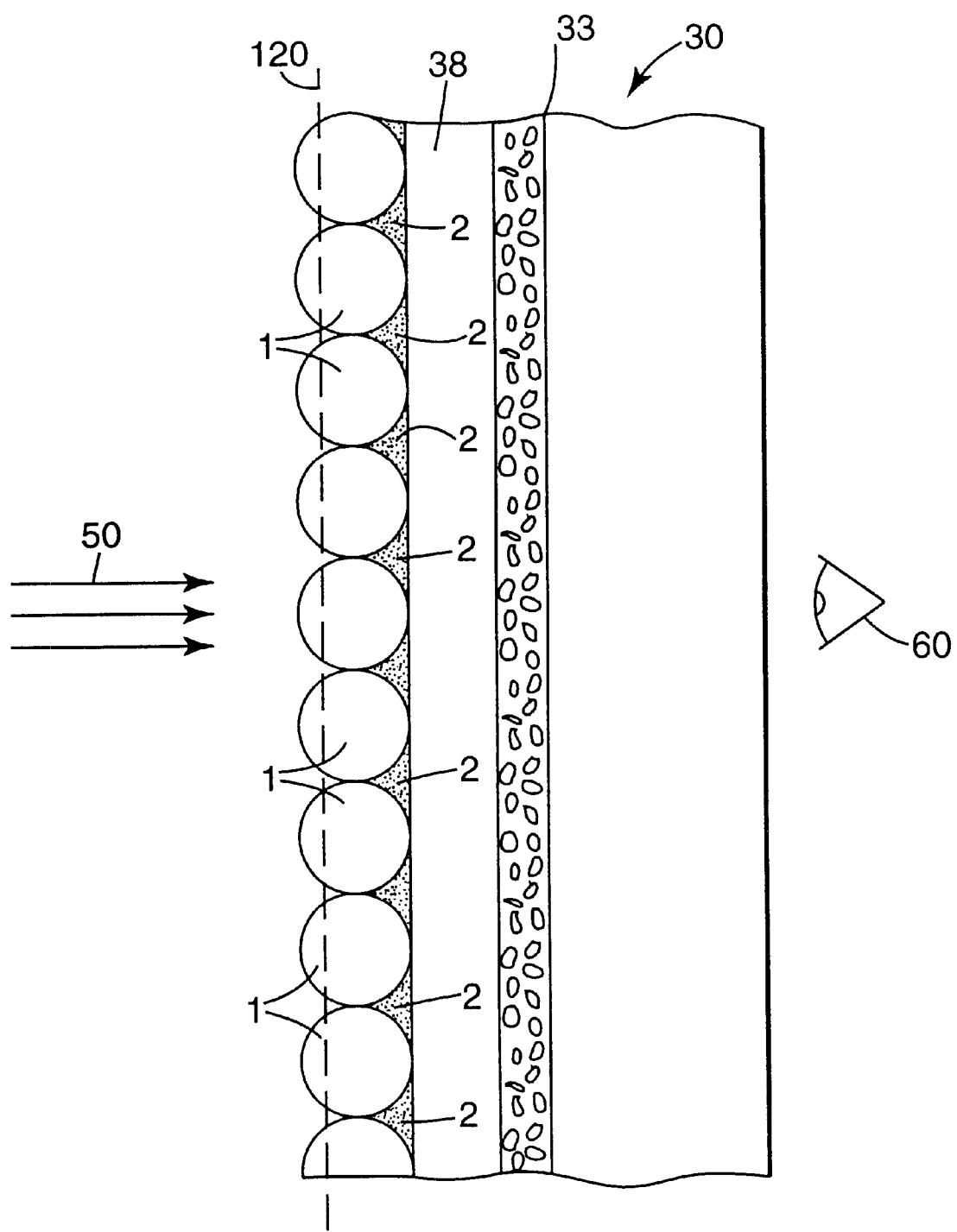
FIG. 4 shows a third embodiment of the present invention.

In a third embodiment, shown in FIG. 4, a rear projection screen is designated generally as 30. In this embodiment, diffusion layer 33 is separated from beads 1 by a transparent substrate 38. It is preferred that the thickness of substrate 38 be as small as possible, and that thickness of diffusion layer 33 also be as small as possible. Again, however greater thicknesses may be used if image resolution and other desirable image properties are not degraded to an unacceptable level.

Figure 5:
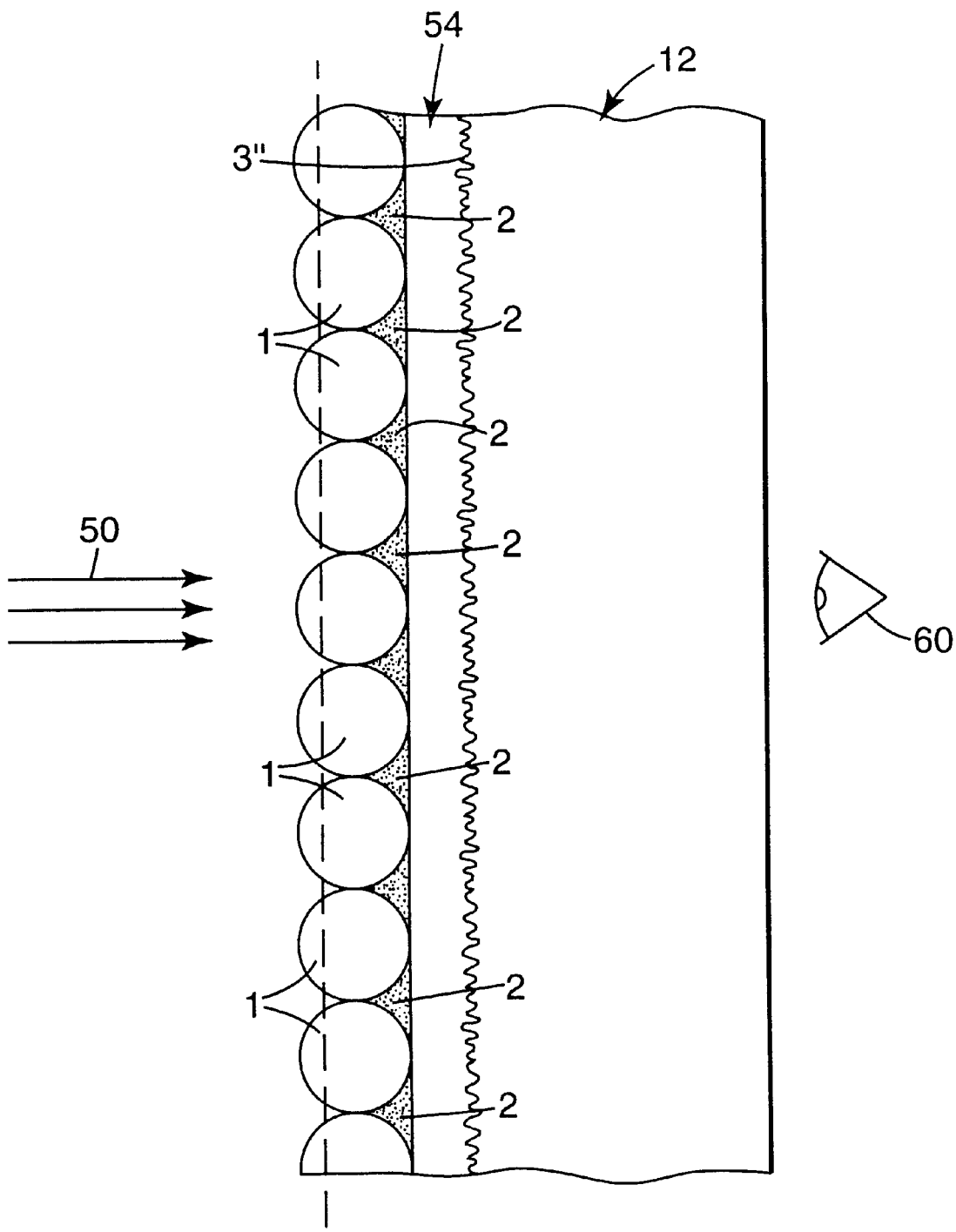
FIG. 5 shows a fourth embodiment of the present invention.

In a fourth embodiment, portrayed in FIG. 5, surface 3" is coated with a filler layer 54, which has a refractive index different from that of substrate 12, hereby forming diffusing interface, while still providing smooth layer 55 in contact with beads 1. By providing filler layer 54, the amount of diffusion provided by interface 53 can be controlled effectively. In some embodiments a reduced level of diffusion is provided by making the difference between refractive indices of layers 12 and 54 can relatively small. In addition, the overall transmission of light by the screen may be increased by such an appropriate choice of materials for layers 12 and 54. Filler layer 54 can be applied in the form of a liquid polymeric coating that can then be solidified by any appropriate curing process such as reactive curing or evaporation of solvent, to form a solid layer.

Figure 6:
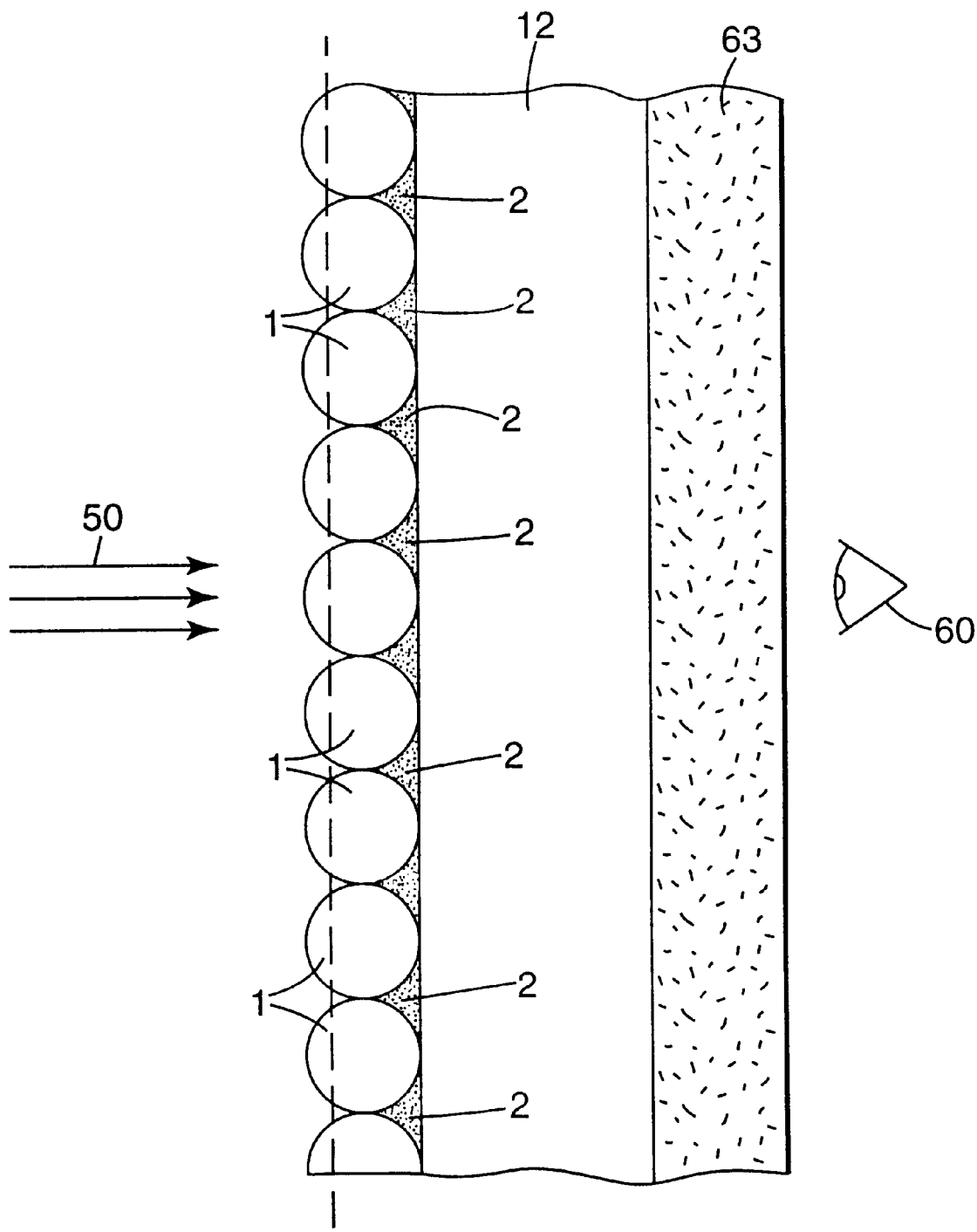
FIG. 6 shows a fifth embodiment of the present invention.

FIG. 6 illustrates another embodiment of the invention. In the embodiment of FIG. 6 a diffuser 63 is positioned adjacent side 11 of substrate 12. As shown in FIG. 6 diffuser 63 is a bulk diffuser. Those skilled in the art will perceive that diffuser 63 could be a thin film diffuser or a diffuser formed by structured surface as in the previously shown embodiments.

Figure 7:
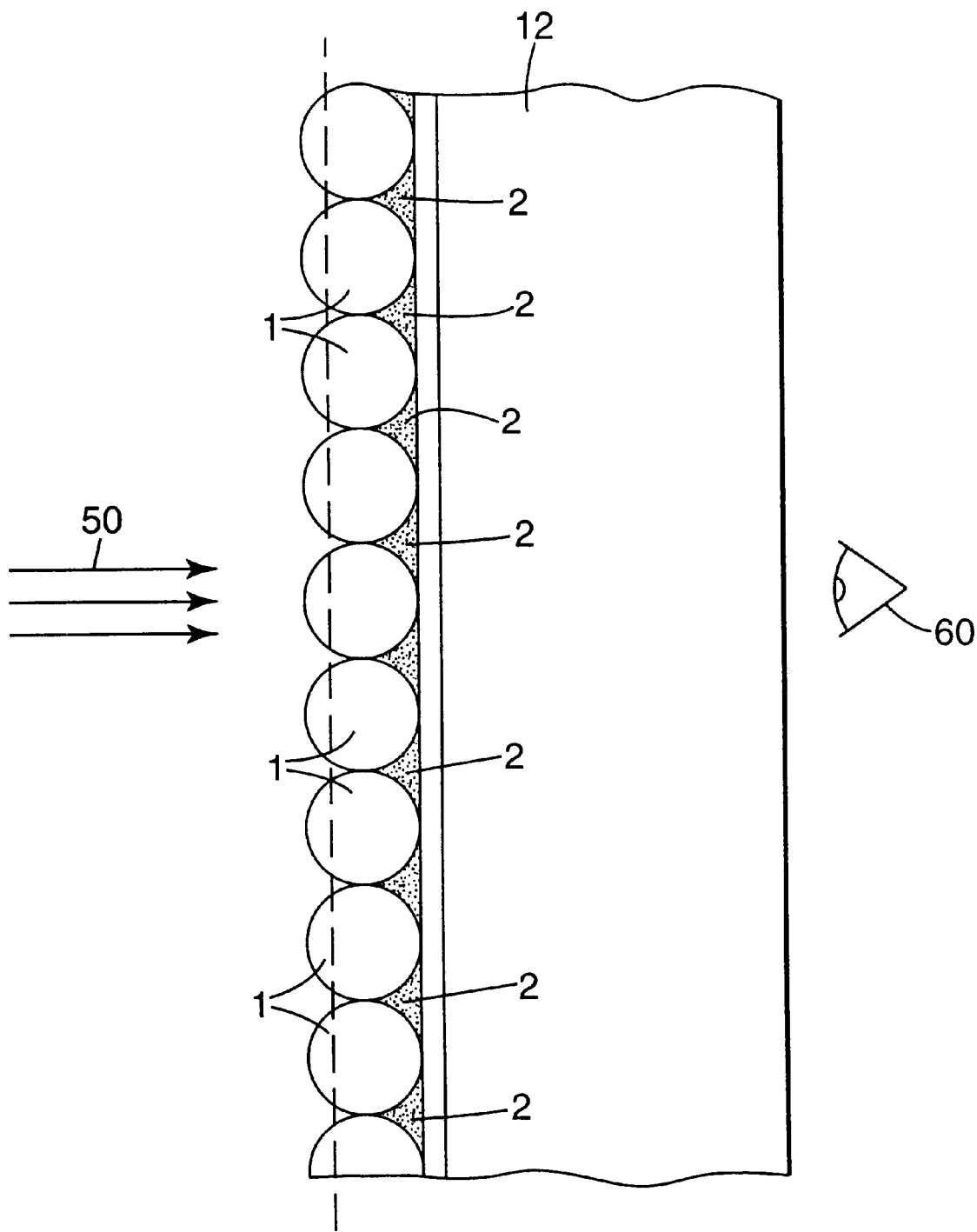
FIG. 7 shows a sixth embodiment of the present invention.

FIG. 7 shows a further embodiment of the invention. In the embodiment of FIG. 7, the same material that forms opaque layer 14 acts as the diffuser. This may be accomplished by mixing silica particles with the material that forms opaque layer 14. This material will act as a diffuser in the thin areas between beads 1 and substrate 12 but will still be effectively opaque in the thicker areas in interstices 2.

As may be seen from the forgoing discussion the diffuser according to the present invention must be placed such that light traveling through the screen will pass through the diffuser after passing through beads 1 but before exiting the screen.

What is claimed is:

1. A rear projection screen comprising:
   a transparent substrate;
   a plurality of refracting beads on a first surface of said substrate;
   an opaque matrix surrounding said beads; and
   a diffusing layer between said beads and said first surface of said substrate.

2. The projection screen of claim 1 wherein said diffusing layer includes optical inhomogeneities on said first surface.

3. The projection screen of claim 2 wherein said optical inhomogeneities include structures on said first surface.

* * * * *